United States Patent Office 3,275,665
Patented Sept. 27, 1966

3,275,665
PROCESS FOR THE PREPARATION OF
$\Delta^{9(11)}$-STEROID COMPOUNDS
Peter Ziegler, Toronto, Ontario, and John C. Grivas, Weston, Ontario, Canada, assignors to Canada Packers Limited, Toronto, Ontario, Canada
No Drawing. Filed Jan. 23, 1964, Ser. No. 339,611
19 Claims. (Cl. 260—397.5)

This invention relates to a novel process for the preparation of $\Delta^{9(11)}$-steroid compounds from 12-oxygenated steroid starting materials and, in particular, to a process for the conversion of 12-oxygenated steroids, such as those occurring in the bile acids and sapogenins and derivatives thereof, into $\Delta^{9(11)}$-steroid compounds devoid of the C–12 oxygen function.

The $\Delta^{9(11)}$-steroid compounds produced by the present process are important intermediates for the preparation of 11-oxygenated steroid hormones including cortisone, hydrocortisone and the derivatives and analogues thereof, and particularly, for the preparation of corticosteroids of high therapeutic value which are characterized by an oxygen function at position 11 and another substituent such as halogen, at position 9.

It is well known in the art that one of the main difficulties in the manufacture of corticoid hormones is the introduction of an oxygen function at C–11 of the cyclopentanophenanthrene molecule. This operation is still more difficult if it is also desired to introduce a halogen atom at position C–9, particularly when using as starting materials compounds containing a keto group at position C–12. The usual procedure has involved initial production of the 11-oxygenated steroids by one of the lengthy routes known to the art. The 9,11-disubstituted steroids are then prepared in rather unsatisfactory yield, from the relatively expensive 11-oxygenated steroids by a series of complex reaction steps, e.g., involving tosylation of the 11-oxy group, dehydrotosylation to provide the 9(11) double bond, and addition of hypohalous acid to the $\Delta^{9(11)}$-bond. Transformation of $\Delta^{9(11)}$-compounds to the 9α-halo-11β-hydroxy derivatives is described in Patent No. 2,852,511.

The present invention permits the important $\Delta^{9(11)}$-intermediates to be produced in good yields from the 12-oxygenated steroid starting materials without going through the 11-oxygenated compounds and with relatively few process steps. We have discovered that the 12-oxygen function can be eliminated from $\Delta^{9(11)}$-12-keto and $\Delta^{9(11)}$-12-hydroxysteroids in a very satisfactory manner by reduction with alkali metal aluminum hydride-aluminum halide reagent. Substantially pure $\Delta^{9(11)}$-compounds free from $\Delta^{11(12)}$-isomers, are readily recovered from the reaction mixture in good yields. This is quite surprising in view of the difficulties that have been encountered with other methods.

The Wolff-Kishner reduction or its Huang-Minlon modification represents a standard method for the reduction of carbonyl functions to methyl or methylene groups. Excellent yields are obtained in the case of isolated, non-conjugated ketones. Even hindered saturated ketones can be reduced by this procedure. However, conjugated carbonyl groups behave somewhat differently, sometimes forming cyclic compounds or involving a 1,2-shift of the double bond. Several workers have applied the Wolff-Kishner reduction to $\Delta^{9(11)}$-12-ketosteroids. Reichstein reduced $\Delta^{9(11)}$-12-ketocholenic acid as well as the corresponding 3-hydroxy analogue and obtained a mixture of $\Delta^{9(11)}$- and $\Delta^{11(12)}$-cholenic acids which could not be separated by standard methods even though it seems that the $\Delta^{9(11)}$-isomer predominates. On the other hand, application of the Huang-Minlon procedure to sapogenins gave relatively satisfactory results; $\Delta^{9(11)}$-dehydrotigogenin was obtained in somewhat better than 50% yield from the corresponding 12-keto compound. The difference in the behavior of the bile acids and sapogenins is apparently due to the fact that the $\Delta^{9(11)}$-unsaturated compound crystallizes out very readily from the mixture of $\Delta^{9(11)}$- and $\Delta^{11(12)}$-sapogenins, while the $\Delta^{9(11)}$- and $\Delta^{11(12)}$-unsaturated bile acid mixtures are isomorphic. This difficulty in separation of isomers with compounds of the bile acid series is not encountered when the reduction is carried out by the process of the present invention.

It will be seen that the present invention is of particular advantage in preparing the $\Delta^{9(11)}$-steroid compounds from the corresponding 12-oxygenated steroids in the bile acid series. Another advantage consists in the fact that $\Delta^{9(11)}$-12-ketosteroid starting materials are readily available in good yield from the bile acids by known methods. Thus, methyl 3α-acetoxy-$\Delta^{9(11)}$-12-ketocholenate or its saponification product can be obtained in approximately 85% yield from desoxycholic acid by conversion of the acid to methyl 3α-acetoxy-12-ketochloanate followed by treatment with selenium dioxide. It will be understood, however, that the alkali metal aluminum hydride-aluminum halide reduction can also be utilized with $\Delta^{9(11)}$-12-keto and $\Delta^{9(11)}$-12-hydroxysteroid starting materials from other sources.

Therefore, it is an object of the present invention to provide an improved process for the preparation of $\Delta^{9(11)}$-steroid compounds from steroid starting materials having a 12-oxygen function.

Another object of the present invention is to provide an improved method for removing the 12-oxygen function from $\Delta^{9(11)}$-unsaturated 12-oxygenated steroid compounds.

A further object of the invention is to provide an improved process for removing the 12-oxygen function from 12-oxygenated $\Delta^{9(11)}$-steroid compounds having the bile acid side chain so as to improve the economics of the bile acid route to cortical steroids.

Another still further object of the invention is to provide an improved process for the conversion of 12-keto-pregnane compounds to useful $\Delta^{9(11)}$-derivatives.

The invention in one aspect comprises the reduction of either $\Delta^{9(11)}$-12-keto or $\Delta^{9(11)}$-12-hydroxysteroids by treatment with alkali metal aluminum hydride-aluminum halide reagent to eliminate the 12-oxygen function. This is essentially a one-step direct reduction method. An additional feature of the invention resides in a two-stage reduction method for 12-keto-$\Delta^{9(11)}$-steroids wherein the 12-keto group is first reduced to 12ξ-hydroxy with a mild reducing agent, such as alkali metal borohydride, and the 12ξ-hydroxy group is then eliminated by treatment with the alkali metal aluminum hydride-aluminum halide reagent. Lithium aluminum hydride-aluminum chloride reagent is the preferred alkali metal aluminum hydride-alkali metal halide reagent and sodium borohydride is the preferred reducing agent for the preliminary reducing step of the two-stage operation. Though the two-stage reduction results in somewhat greater yields, the direct reduction is of comparable commercial significance because of the obvious advantages in a single-stage process obviating the necessity of separating the intermediate and the further reaction with additional reagents.

The process of the invention, as aforestated, has general application to $\Delta^{9(11)}$-12-keto and $\Delta^{9(11)}$-12-hydroxysteroids and may be applied, for example, to derivatives of ergostane, cholestane, coprostane, sitostane, stigmastane, spirostane, cholane, allocholane, pregnane, allopregnane, and androstane. The starting materials can be variously substituted in the nucleus or in the side chain and can have any configuration. Keto and ester groups, if present in other positions on the steroid nucleus, e.g., at C–3, in general, are converted to hydroxyl during the course of the LiAlH$_4$–AlCl$_3$ reduction. Hydroxy or acetoxy groups in the C–17 side chain, particularly at the C–20 position seem to hinder the attack on the C–12 oxygen function and preferably are removed prior to the LiAlH$_4$–AlCl$_3$ reduction. Free acid or esterified acid groups in the side chain, e.g., at C–21 or C–24 are reduced to corresponding alcohols.

A representative series of reactions starting with desoxycholic acid and utilizing the procedure of the present invention is as follows:

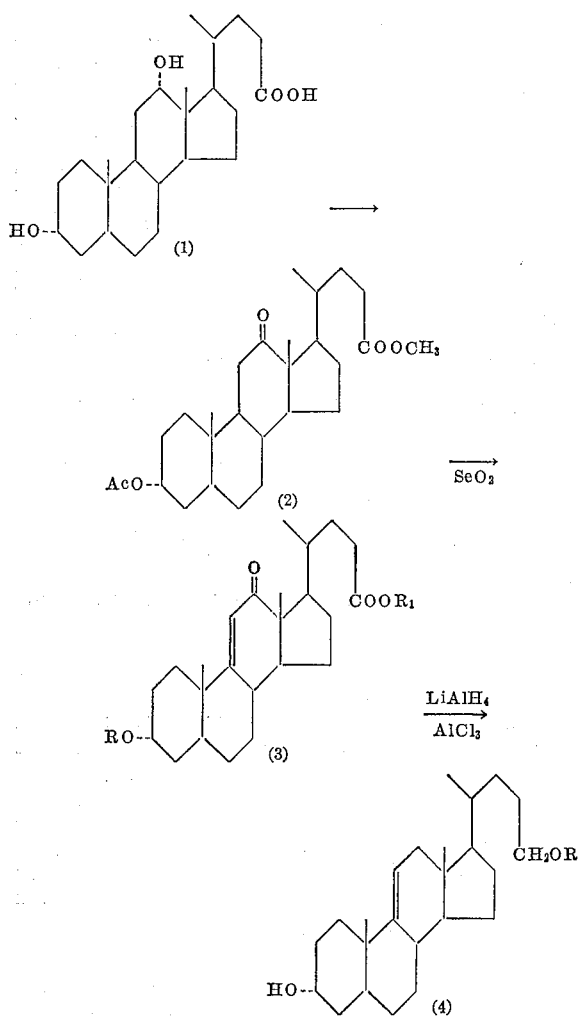

In the foregoing representation desoxycholic acid (1) is converted into methyl 3α-acetoxy-12-ketocholanate (2) by known procedures, e.g., by methylating the acid, acetylating the resulting methyl desoxycholate to provide methyl 3α-acetoxy-12α-hydroxycholanate, and oxidizing this compound with chromic acid. Good yields of methyl 3α-acetoxy-12-ketocholanate are obtainable. This compound (2) is then subjected to selenium dioxide treatment, preferably in acetic acid, so as to obtain the 12-keto-Δ$^{9(11)}$-compound (3). In compound (3) R$_1$ may be hydrogen or alkyl (e.g., methyl) and R may be hydrogen or Ac, where Ac is the acyl radical of a hydrocarbon carboxylic acid containing from 1 to 12 carbon atoms (e.g., acetyl). The conversion of (3) to (4) is shown as a one-step reduction with LiAlH$_4$–AlCl$_3$, but this may alternatively be accomplished by the two-stage operation described above.

Further graphical illustrations representing the invention are as follows:

(A)
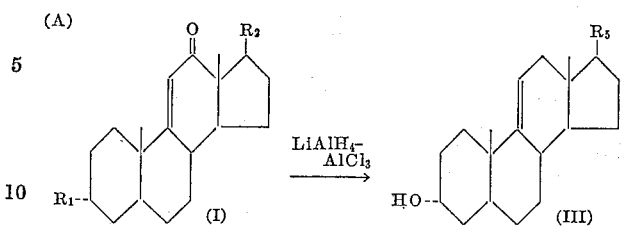

(B)
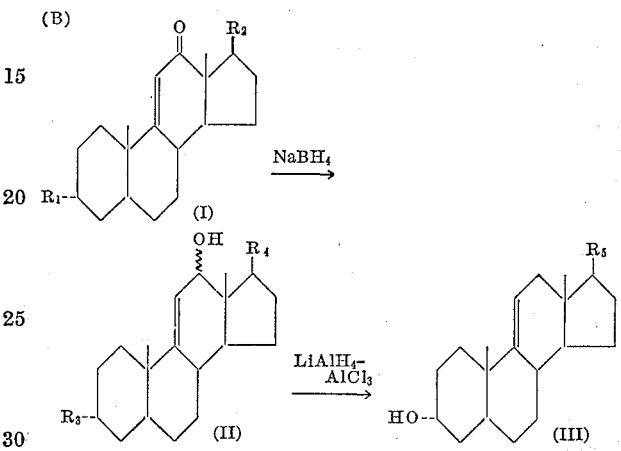

wherein

R$_1$ is —OAc, —OH or —O—COOEt;

R$_2$ is $$-\overset{CH_3}{\underset{|}{C}H}-(CH_2)_2COOCH_3, \quad -\overset{CH_3}{\underset{|}{C}H}-(CH_2)_2COOH$$

or —CH$_2$—CH$_3$;

R$_3$ is —OH, OAc or —O—COOEt;

R$_4$ is $$-\overset{CH_3}{\underset{|}{C}H}-(CH_2)_2COOCH_3, \quad -\overset{CH_3}{\underset{|}{C}H}-(CH_2)_2COOH$$

or —CH$_2$—CH$_3$;

and

R$_5$ is $$-\overset{CH_3}{\underset{|}{C}}-(CH_2)_2-CHOH$$

or —CH$_2$CH$_3$;

where Ac is the same as defined above.

The reduction-removal of the 12-keto or 12-hydroxyl group with alkali metal aluminum hydride in the presence of AlCl$_3$ is a surprisingly simple reaction if conducted under the proper conditions. For example, the reaction can be effected with a molar excess, with respect to the steroid, of lithium aluminum hydride and aluminum chloride reagent prepared in ether. Caution should be exercised in the preparation and handling of the LiAlH$_4$–AlCl$_3$ reagent. All the equipment, reagents and solvents should be dried and the reaction carried out under anhydrous conditions. Preferably, AlCl$_3$ is first added to the ether and then the LiAlH$_4$ is slowly added to the ethereal solution of AlCl$_3$ since considerable heat is produced. The same consideration should be applied during addition of the steroid solution to the reagent and during the decomposition of the reaction mixture with water and dilute acid.

It is usually preferable to freshly prepare the LiAlH$_4$–AlCl$_3$ reagent and then the solution of steroid is slowly added to this reagent within a short time after preparation, preferably within 5 to 10 minutes. After the steroid solution has been added to the reagent, the hydrogenolysis of the steroid compound is completed by refluxing for a suitable period, for example, for about 2 to 5 hours. The reaction mixture is then cooled to room temperature whereupon addition of water and acid decomposes excess reducing agent and acidifies the product.

Lower temperatures and longer reaction times may be used with satisfactory results. Hydrogenolysis will proceed at room temperature overnight.

Any non-crystalline residue from this reaction, on additional reduction with the reducing reagent, can provide substantial additional amounts of $\Delta^{9(11)}$-compound.

Ethers generally are the best solvents for this reaction. The lower alkyl ethers such as ethyl ether have been found to give better results than ethers such as tetrahydrofuran (THF) or dioxane, although either of the latter may be used.

A molar excess of $LiAlH_4$ reducing agent with respect to steroid should be employed but the amount of the excess is not sharply critical. However, in order to obtain maximum yields of the $\Delta^{9(11)}$-steroid product in readily recoverable form, proper proportions of $AlCl_3$ to $LiAlH_4$ must be utilized. It has been found that a ratio of $AlCl_3$ to $LiAlH_4$ of between 1:1 to 4:1 provides satisfactory results with best results being obtained with a ratio between 2:1 and 4:1. Below 1:1 relatively low yields of difficultly separable product are obtained. Above 4:1 appears to provide no advantage. This is illustrated by experiments which are summarized in the following table:

TABLE I

| Ex. | Reactants,[1] Steroid: $LiAlH_4$: $AlCl_3$ (moles) | Products [2] | | | Total Yield,[3] Percent |
|---|---|---|---|---|---|
| | | Yield, Percent | M.P., °C. | Additional Yield, Percent | |
| 1 | 1:5:4 | 26 | ([4]) | | |
| 2 | 1:5:5 | 50 | [5] 130–145 | | |
| 3 | 1:5:8 | 65 | 173–176 | 7 | 72 |
| 4 | 1:5:12 | 74 | 174–176 | 4 | 78 |
| 5 | 1:5:16 | 79 | 177–179 | 3 | 82 |
| 6 | 2:5:16 | 74 | 176–178 | | |

[1] Methyl $3\alpha,12\xi$-dihydroxy-$\Delta^{9(11)}$-cholenate.
[2] $3\alpha,24$-dihydroxy-$\Delta^{9(11)}$-cholene.
[3] Yield after retreatment of the residue obtained from first treatment.
[4] Product had broad melting range and contained chlorine.
[5] Product again contained chlorine, had a broad melting range and purity, could not be improved by repeated recrystallization.

The two-step process, represented by Equation B above, consists of treatment of type I compounds with a mild reducing agent such as sodium borohydride to effect reduction of the 12-keto function to the 12$\xi$-hydroxy function. The procedure of U.S. Patent 2,862,933 may be used. Usually, this reaction produces a mixture of the two possible 12-hydroxy isomers, this mixture being designated as type II compounds. This mixture of isomers is then used in the second step (after esterification, if desired) or the mixture of isomers may be separated into its two components (12$\alpha$- and 12$\beta$- hydroxy compounds) prior to the second step. It has been found that esterification of type II compounds having the bile acid side chain, prior to the second step, in most instances results in improved yields. The 12$\alpha$-hydroxy isomer is reduced more rapidly and in greater yields than the 12$\beta$-hydroxy isomer. However, separation of these isomers is not essential. The product of the first reaction (type II compounds) is then treated with $LiAlH_4$–$AlCl_3$ to produce compound of type III.

Reduction of the $\Delta^{9(11)}$-ketosteroids of type I with excess sodium borohydride proceeds substantially quantitatively in aqueous alkaline solution at about 20° C. to 25° C. for 20 hours and in shorter time at elevated temperature. The reaction can also be carried out in refluxing aqueous tetrahydrofuran in about 3 to 4 hours, but the yield is less satisfactory, e.g., about 70–80%. Ester groups on the bile acid side chain or acyloxy groups at C–3 are not affected by this reduction. The excess reducing agent is decomposed and the product precipitates on the addition of dilute sulfuric acid. The precipitate can be washed and dried or extracted with ether, washing the extracts, drying and evaporating to give a residue of the desired product. The intermediate, if in acid form ($R_4$ of II has a free acid group hydrogen) can be used directly for the second reduction step or may first be methylated by dissolution in methanol and reaction with an ethereal solution of diazomethane. The solvents are then evaporated to give the crude ester ($R_4$ of II has an esterified acid group).

The crude acid or ester (type II) is then dissolved in ether and this solution is added dropwise to a stirred solution of $AlCl_3$–$LiAlH_4$ in ether. Hydrogenolysis of the steroid proceeds by refluxing for about 4 hours whereupon the 12-hydroxy group is removed with the simultaneous reduction of the side chain acid or ester groups to 24-hydroxy and the accompanying reduction of the 3-acyloxy group, if present. The mixture is then cooled, decomposed by dropwise addition of water, acidified with dilute $H_2SO_4$, and extracted with ether. The solvent extract is washed with water, dried and evaporated to provide the desired $\Delta^{9(11)}$-compound of type III. The compound in substantially pure form can be obtained by crystallization from ether. On evaporating the ether to dryness after removal of crystalline material, a non-crystalline residue is obtained which on retreatment with $AlCl_3$–$LiAlH_4$ affords additional amounts of III providing total yields of up to 80% or more.

The following specific examples are illustrative of the invention.

Example 1.—Preparation of $3\alpha,24$-dihydroxy-$\Delta^{9(11)}$-cholene from methyl $3\alpha$-acetoxy-$\Delta^{9(11)}$-12-ketocholenate Lithium aluminum hydride-aluminum chloride reagent was prepared by dissolving aluminum chloride (8.45 g.; 0.063 mole) in ether (50 ml.), and then adding lithium aluminum hydride (1 g.; 0.026 mole) in portions to this solution. The mixture was stirred for 20 minutes, thereafter a solution of methyl $3\alpha$-acetoxy-$\Delta^{9(11)}$-12-ketocholenate (2.35 g.; 0.0053 mole) in ether (80 ml.) was added dropwise to the reagent solution. This addition took 20 minutes. The mixture was then refluxed for 4.5 hours, cooled to 20° C., and decomposed by dropwise addition of water and dilute sulfuric acid. The ether layer was separated, the aqueous layer was extracted with methylene chloride, the two solvent extracts were combined, washed with water, dried over magnesium sulfate, and evaporated to dryness. The residue (1.94 g.) was taken up in ether, the mixture was refrigerated, and the precipitate was filtered off to provide 1.14 g. (60%) of $3\alpha,24$-dihydroxy-$\Delta^{9(11)}$-cholene, M.P. 175–177° C.

Recrystallization from methylene chloride-ether afforded pure $3\alpha,24$-dihydroxy-$\Delta^{9(11)}$-cholene, M.P. 178–180° C. and $[\alpha]_D^{22}$ +55.6° (c., 0.488, dioxane).

Example 2.—Preparation of $3\alpha,24$-dihydroxy-$\Delta^{9(11)}$-cholene from $3\alpha$-hydroxy-$\Delta^{9(11)}$-12-ketocholenic acid $3\alpha$-hydroxy-$\Delta^{9(11)}$-12-ketocholenic acid (10 g.) was dissolved in a solution of sodium hydroxide (1.15 g.) in distilled water (50 ml.). Sodium borohydride (2.5 g.) was added, the mixture was stirred at 20° C. for 20 hours, and the clear solution was then added dropwise to a stirred solution of concentrated sulfuric acid (3.6 ml.) in water (100 ml.). The resulting precipitate was filtered off, washed with water, and vacuum-dried at 60° C. to give 9.96 g. of crude $3\alpha,12\xi$-dihydroxy-$\Delta^{9(11)}$-cholenic acid as a white solid.

The above crude acid (3 g.), dissolved in methanol, was methylated with an ethereal solution of diazomethane. The solvents were evaporated in vacuo to give methyl $3\alpha,12\xi$-dihydroxy-$\Delta^{9(11)}$-cholenate (3.12 g.).

The crude methyl ester (2.29 g.) was dissolved in ether (100 ml.), and this solution was then added dropwise to stirred lithium aluminum hydride-aluminum chloride reagent in ether. The latter was prepared by dissolving aluminum chloride (6.05 g.) in ether (50 ml.), slowly adding thereto lithium aluminum hydride (1.07 g.), and stirring at 20° C. for 20 minutes. The hydrogenolysis of the steroid was carried out by refluxing the mixture for 4 hours. The mixture was cooled, decomposed by dropwise addition of water, acidified with dilute $H_2SO_4$, and extracted with ether. The solvent extract was washed with water, dried, and evaporated to a small volume to provide 1.22 g. of 3α,24-dihydroxy-$\Delta^{9(11)}$-cholene, M.P. 172–175° C. The filtrate was evaporated to dryness, the residue was re-treated as above to afford an additional 0.25 g. of the product, M.P. 172–175° C. Total yield was 1.47 g. (72%).

*Example 3.—Preparation of 3α,24-dihydroxy-$\Delta^{9(11)}$-cholene from methyl 3α-acetoxy-$\Delta^{9(11)}$-12-ketocholenate*

Methyl 3α-acetoxy-$\Delta^{9(11)}$-12-ketocholenate (4.45 g.) was dissolved in tetrahydrofuran (50 ml.), a solution of sodium borohydride (0.76 g.) in water (3 ml.) was added, and the mixture was refluxed for 3–4 hours. The mixture was cooled, carefully decomposed by dilute sulfuric acid, and the products were extracted twice with ether. The combined solvent extracts were washed with water, dried, and evaporated to give a residue (4.54 g.), containing mixed 12α- and 12β-hydroxy isomers of methyl 3α-acetoxy-$\Delta^{9(11)}$-cholenate.

This residue (4.54 g.) was dissolved in ether (80 ml.), and the solution was then added dropwise over a period of half an hour to the ethereal solution (80 ml.) of the lithium aluminum hydride-aluminum chloride reagent. The latter was prepared from aluminum chloride (10.5 g.; 0.08 mole) and lithium aluminum hydride (1.9 g.; 0.05 mole) in the manner described in previous examples. The reaction mixture was refluxed for 4.5 hours, it was then worked up in the usual fashion to yield a residue (3.7 g.) which crystallized from ether to give 1.51 g. of 3α,24-dihydroxy-$\Delta^{9(11)}$-cholene, M.P. 174–177° C. A second crop yielded an additional 0.283 g. of the product. Evaporation of the ether and retreatment of the residue resulted in an additional 0.223 g. of product. Total yield 56%.

*Example 4.—Preparation of 3α,24-dihydroxy-$\Delta^{9(11)}$-cholene from 3α,12ξ-dihydroxy-$\Delta^{9(11)}$-cholenic acid*

3α,12ξ-dihydroxy-$\Delta^{9(11)}$-cholenic acid (0.95 g.), prepared according to the procedure of Example 2, was put into a Soxhlet extraction thimble. $LiAlH_4$–$AlCl_3$ reagent was prepared in ether (150 ml.) from $AlCl_3$ (5.25 g.) and $LiAlH_4$ (0.95 g.). The reagent solution was then refluxed for 9 hours in the Soxhlet apparatus, and during this time, the condensed ether gradually dissolved all of the steroid in the extraction thimble. The mixture was treated in the usual fashion, and the product was isolated by crystallization from ether to yield 0.429 g. (55%) of 3α,24-dihydroxy-$\Delta^{9(11)}$-cholene, M.P. 173–176° C.

*Example 5.—Preparation of 3α,24-dihydroxy-$\Delta^{9(11)}$-cholene from methyl 3α,12α-dihydroxy-$\Delta^{9(11)}$-cholenate and from methyl 3α,12β-dihydroxy-$\Delta^{9(11)}$-cholenate*

Methyl 3α,12ξ-dihydroxy-$\Delta^{9(11)}$-cholenate (15.05 g.), prepared as in Example 2, was absorbed onto silica gel (400 g.) from benzene, and separated into 20 fractions by elution with mixtures of benzene-acetone. Elution with benzene:acetone (5:1) gave the 12β-isomer, $[\alpha]_D^{27}$ +32° C. (methanol), which failed to crystallize. Elution with benzene:acetone (4:1) yielded the 12α-isomer, M.P. 99–103° C. and $[\alpha]_D^{27}$ +97° C. (methanol).

Hydrogenolysis of the 12α-isomer with $LiAlH_4$–$AlCl_3$ in ether, as described in the above examples, yielded 3α,24-dihydroxy-$\Delta^{9(11)}$-cholene (1.48 g.; 82%), M.P. 178–179° C. Under the same conditions, the 12β-isomer afforded 67% of 3α,24-dihydroxy-$\Delta^{9(11)}$-cholene, M.P. 173–176° C.

*Example 6.—Preparation of 3α-hydroxy-$\Delta^{9(11)}$-pregnene from 3α-ethoxycarbonyloxy-$\Delta^{9(11)}$-12-ketopregnene*

One gram of 3α-ethoxycarbonyloxy-$\Delta^{9(11)}$-12-ketopregnene [prepared from 3α,12α-dihydroxypregnane-20-one by reducing this compound to 3α,12α-dihydroxypregnane by Huang-Minlon's modification of the Wolff-Kishner reduction, preferential esterification of this compound to give the 3α-cathylate (3α-ethoxycarbonyloxy-12α-hydroxypregnane), oxidation of the mono-cathylate with chromic acid to convert the 12-hydroxy group to 12-keto, and dehydrogenation of the 3α-ethoxycarbonyloxy-12-ketopregnane with selenium dioxide to provide $\Delta^{9(11)}$-unsaturation], dissolved in tetrahydrofuran (20 ml.), was treated with a solution of $NaBH_4$ (0.3 g.) in water (1.5 ml.), and the mixture was refluxed for 5 hours. After a decomposition with dilute sulfuric acid, the products were extracted with ether, and the solvent extract was processed in the usual manner to yield an amorphous residue (0.97 g.).

$AlCl_3$ (5.5 g.; 41 mmole) was dissolved in ether (30 ml.), then $LiAlH_4$ (0.49 g.; 12.5 mmole) was added in portions, and the mixture was stirred for 20 minutes. A solution of the steroid (0.97 g.; 2.5 mmole) in ether (30 ml.) was then added dropwise within 15 minutes, and the mixture was refluxed for 4 hours. Decomposition by water, then by dilute sulfuric acid was followed by extraction with ether. The solvent extract was washed, dried, and evaporated to provide a residue (0.75 g.) from which 580 mg. (75%) of 3α-hydroxy-$\Delta^{9(11)}$-pregnene were isolated. This material had double M.P. 121–122° C. and 128–129° C.

The foregoing examples show that lithium aluminum hydride-aluminum chloride reagent in proper proportions effectively eliminates the 12-hydroxy group from methyl 3α - 12 - dihydroxy-$\Delta^{9(11)}$-cholenate, methyl 3α-acetoxy-$\Delta^{9(11)}$-12-hydroxycholenate and from 3α,12-dihydroxy-$\Delta^{9(11)}$-cholenic acid, the compounds being present either as a mixture of the 12α- and 12β-hydroxy isomers or in the form of a single isomer. The same reaction is also shown to be applicable to the α,β-unsaturated ketones such as methyl 3α-acetoxy-$\Delta^{9(11)}$-12-ketocholenate to yield the desired $\Delta^{9(11)}$-steroid. Additionally, it has been illustrated that the reaction is effective in the pregnane series. It is apparent that the invention has widespread applicability and that an important and new link in the production of $\Delta^{9(11)}$-intermediates has been provided.

We claim:

1. A process which comprises reacting a 12-oxygenated-$\Delta^{9(11)}$-steroid compound in which any C–20 carbon atom present is bonded only to carbon and hydrogen atoms with an alkali metal aluminum hydride-aluminum halide reducing agent to remove the 12-oxygen function.

2. The process of claim 1 wherein the 12-oxygenated-$\Delta^{9(11)}$-steroid compound reacting with said reducing agent has a 12-keto group.

3. The process of claim 1 wherein the 12-oxygenated-$\Delta^{9(11)}$-steroid compound reacting with said reducing agent has a 12-hydroxy group.

4. A process as claimed in claim 1 in which the reducing agent comprises an ethereal solution of aluminum chloride and lithium aluminum hydride in a molar ratio of $AlCl_3$ to $LiAlH_4$ greater than unity.

5. A process as claimed in claim 4 in which the ratio of $AlCl_3$ to $LiAlH_4$ is from about 2:1 to 4:1.

6. A process which comprises the steps of reducing a $\Delta^{9(11)}$-12-ketosteroid compound in which any C–20 carbon atom present is bonded only to carbon and hydrogen atoms with a mild reducing agent to convert the 12-keto group to a 12-hydroxy group and then reacting the resulting $\Delta^{9(11)}$-12-hydroxysteroid compound with an alkali metal aluminum hydride-aluminum halide reducing agent to remove the 12-hydroxy group.

7. A process as claimed in claim 6 in which the mild reducing agent is an alkali metal borohydride and the second reducing agent is aluminum chloride-lithium aluminum hydride in a molar ratio of $AlCl_3$ to $LiAlH_4$ greater than unity.

8. A process as claimed in claim 7 in which the mild reducing agent comprises $NaBH_4$ and the molar ratio of $AlCl_3$ to $LiAlH_4$ is from about 2:1 to 4:1.

9. A process as claimed in claim 8 in which the reduction of the 12-keto group to a 12-hydroxy group is conducted with an excess of sodium borohydride in aqueous alkaline solution.

10. A process comprising reacting a 12-oxygenated-$\Delta^{9(11)}$-steroid compound of the bile acid series with an excess of $AlCl_3$–$LiAlH_4$ to remove the 12-oxygen function.

11. A process for preparing $3\alpha,24$-dihydroxy-$\Delta^{9(11)}$-cholene comprising reacting an alkyl $3\alpha$-acyloxy-$\Delta^{9(11)}$-12-ketocholenate with an excess of $AlCl_3$–$LiAlH_4$ to remove the 12-keto group with accompanying reduction of the $3\alpha$-acyloxy group and reduction of the alkyl ester group in the side chain.

12. A process for preparing $3\alpha,24$-dihydroxy-$\Delta^{9(11)}$-cholene comprising reducing $3\alpha$-hydroxy-$\Delta^{9(11)}$-12-ketocholenic acid with sodium borohydride to provide the 12-hydroxy derivative thereof and reacting said 12-hydroxy derivative with an excess of $AlCl_3$–$LiAlH_4$ to remove said 12-hydroxy group with simultaneous reduction of the 24-carboxyl group.

13. A process as claimed in claim 12 in which the acid is esterified prior to reaction with $AlCl_3$–$LiAlH_4$ and wherein removal of the 12-hydroxy group is accompanied by reduction of the ester group.

14. A process for preparing $3\alpha,24$-dihydroxy-$\Delta^{9(11)}$-cholene comprising reducing an alkyl 3-acyloxy-$\Delta^{9(11)}$-12-ketocholenate with sodium borohydride to provide the corresponding 12-hydroxy derivative thereof and reacting said 12-hydroxy derivative with an excess of $AlCl_3$–$LiAlH_4$ to remove the 12-hydroxy group with accompanying reduction of the 3-acyloxy group and reduction of the alkyl ester group.

15. A process for preparing $3\alpha,24$-dihydroxy-$\Delta^{9(11)}$-cholene comprising reducing a compound selected from the group consisting of $3\alpha$-hydroxy-$\Delta^{9(11)}$-12-ketocholenic acid, alkyl esters and esterified $3\alpha$-derivatives thereof, with a mild reducing agent to provide a mixture of the corresponding $12\alpha$-hydroxy and $12\beta$-hydroxy isomers, separating said isomers and subjecting the $12\alpha$-hydroxy isomer to reduction with $AlCl_3$–$LiAlH_4$ to remove the 12-hydroxy group.

16. A process for preparing $3\alpha,24$-dihydroxy-$\Delta^{9(11)}$-cholene from desoxycholic acid comprising converting said desoxycholic acid to a compound selected from the group consisting of $3\alpha$-hydroxy-$\Delta^{9(11)}$-12-ketocholenic acid, alkyl esters and esterified $3\alpha$-derivatives thereof, by steps including chromic acid oxidation of the 12-hydroxy group and selenium dioxide dehydrogenation of the resulting 12-ketosteroid to provide $\Delta^{9(11)}$-unsaturation, and then subjecting the resulting 12-keto-$\Delta^{9(11)}$-steroid compound selected from said group to reduction to remove the 12-oxygen function, said reduction including treatment with $AlCl_3$–$LiAlH_4$.

17. The process of claim 16 wherein said reduction is accomplished by direct reduction of the 12-keto-$\Delta^{9(11)}$-steroid compound with $AlCl_3$–$LiAlH_4$.

18. The process of claim 16 wherein said reduction is accomplished by treatment of said 12-keto-$\Delta^{9(11)}$-steroid compound with $NaBH_4$ to reduce the 12-keto group to a 12-hydroxy group and the resulting 12-hydroxy compound is then reduced with the $AlCl_3$–$LiAlH_4$ to remove the 12-hydroxy group.

19. A process for the preparation of $3\alpha$-hydroxy-$\Delta^{9(11)}$-pregnene comprising reacting $3\alpha$-ethoxycarbonyloxy-$\Delta^{9(11)}$-12-ketopregnene with sodium borohydride to provide the 12-hydroxy derivative of said steroid and reacting said derivative with an excess of $AlCl_3$–$LiAlH_4$ to remove said 12-hydroxy group with accompanying reduction of the 3-ethoxycarbonyloxy group.

References Cited by the Examiner

UNITED STATES PATENTS 2,862,933  12/1958  Smit et al. ———————— 260—397.1

OTHER REFERENCES

Broome et al.: J. Chem. Soc. (London), 1960, pp. 1406–1408.

Kirk et al.: J. Chem. Soc. (London), 1959, pp. 1691–1695, pp. 1691 and 1692 relied on.

McKennis, Jr., et al.: J. Biol. Chem. 175, pp. 217–220 (1948).

Migradichian: Organic Synthesis, N.Y., Reinhold, pg. 11, vol. I, 1957.

Nystrom et al.: J. Amer. Chem. Soc., 80, pp. 2896–2898 (1958).

LEWIS GOTTS, Primary Examiner.

T. M. MESHBESHER, Assistant Examiner.